United States Patent [19]

Pfeiffer

[11] Patent Number: 4,520,054
[45] Date of Patent: May 28, 1985

[54] FLEXIBLE HOLLOW BODY FILLABLE WITH FLUID MEDIUM

[75] Inventor: Claus-Peter Pfeiffer, Reinbek, Fed. Rep. of Germany

[73] Assignee: Metzeler Kautschuk GmbH, Munich, Fed. Rep. of Germany

[21] Appl. No.: 535,874

[22] Filed: Sep. 26, 1983

[30] Foreign Application Priority Data

Sep. 26, 1982 [DE] Fed. Rep. of Germany ....... 3235630

[51] Int. Cl.³ .............................................. B32B 1/02
[52] U.S. Cl. ......................................... 428/35; 5/456; 5/457; 5/461; 428/69; 428/72; 428/76; 428/86; 428/188
[58] Field of Search .......................... 5/456, 457, 461; 428/35, 69, 72, 76, 86, 188

[56] References Cited
U.S. PATENT DOCUMENTS 3,286,285 11/1966 Harvey, Jr. ............................ 5/457
3,780,388 12/1973 Thomas et al. ........................ 5/457

Primary Examiner—George F. Lesmes
Assistant Examiner—P. R. Schwartz
Attorney, Agent, or Firm—Herbert L. Lerner; Laurence A. Greenberg

[57] ABSTRACT

A flexible hollow body fillable with fluid medium and formed of a double fabric having an upper web and a lower web respectively having an outer surface with a layer of elastomeric material and forming an inflatable chamber therebetween including a coated cover fabric applied to at least one of the layers of elastomeric material, the cover fabric having strip-shaped regions detached from the layer of elastomeric material to which the cover fabric is applied so as to define respective tubular chambers; angular strips disposed within the tubular chambers at respective edges thereof for joining the one layer of elastomeric material and the coated cover fabric to one another; the tubular chambers being formed, respectively, with at least one inlet opening for inflating the tubular chambers.

5 Claims, 1 Drawing Figure

U.S. Patent  May 28, 1985  4,520,054
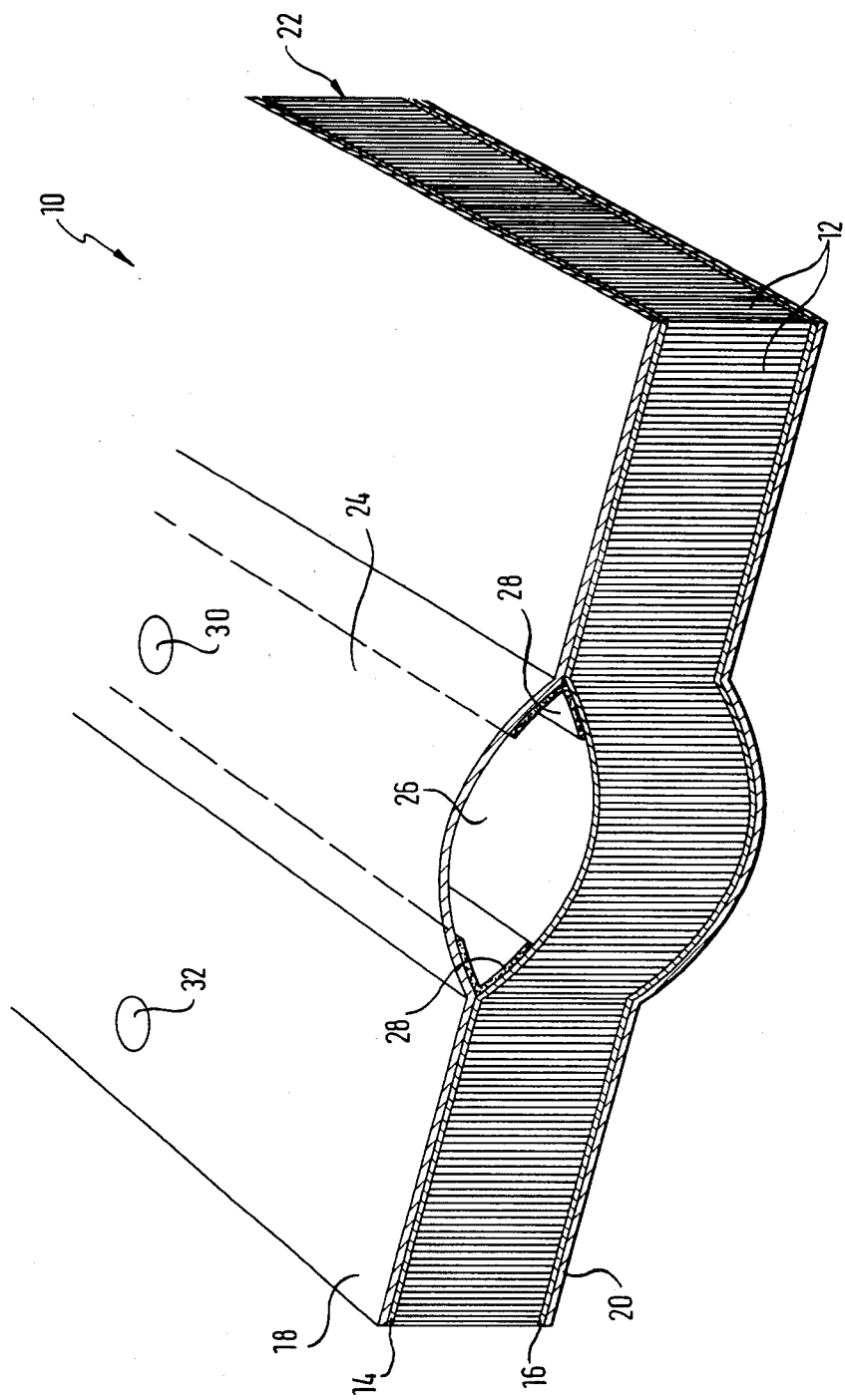

FLEXIBLE HOLLOW BODY FILLABLE WITH FLUID MEDIUM

The invention relates to a flexible hollow body fillable with fluid medium and formed of a double fabric having an upper web and a lower web respectively having an outer surface with a layer of elastomeric material and forming an inflatable chamber therebetween.

A hollow body of this type proceeds from German Published Prosecuted Application (DE-AS) No. 21 48 401 from which is known a double fabric, the upper web and lower web of which are provided on the outer surface with a layer of an elastomeric material and which form an inflatable chamber. The hollow body also has a coated cover fabric which is applied to at least one layer of the elastomeric material. Flexible hollow bodies of this type may be used, for example, for the production of air mattresses, parts of inflatable boats and heat exchangers etc.

Although the rigidity of a panel designed in this manner, as used, for example, as the bottom of inflatable boats, is substantially greater than the rigidity of hitherto conventional panels formed by fluting, this rigidity is insufficient for many uses, for example for the bottom of heavy inflatable motorboats.

Thus, an object of the present invention is to provide a flexible hollow body of the specified type in which the above-mentioned disadvantage does not occur.

In particular, a flexible hollow body is to be proposed which has a greater rigidity than the hitherto conventional "pile panels" (as such panels of pile fabric coated with elastomeric material are also termed).

In accordance with another feature of the invention there is provided a flexible hollow body fillable with fluid medium and formed of a double fabric having an upper web and a lower web respectively having an outer surface with a layer of elastomeric material and forming an inflatable chamber therebetween, comprising a coated cover fabric applied to at least one of the layers of elastomeric material, the cover fabric having strip-shaped regions detached from the layer of elastomeric material to which the cover fabric is applied so as to define respective tubular chambers; angular strips disposed within the tubular chambers at respective edges thereof for joining the one layer of elastomeric material and the coated cover fabric to one another; the tubular chambers being formed, respectively with at least one inlet opening for inflating the tubular chambers.

In accordance with a further feature of the invention, another coated cover fabric is applied to the other layer of elastomeric material and additional tubular chambers are defined by detached strip-shaped regions of the other coated cover fabric applied to the other layer of elastomeric material.

In accordance with an additional feature of the invention, the cover fabric is coated on both sides thereof.

In accordance with an added feature of the invention, the inlet opening is sealable and extends through the coated cover fabric.

In accordance with a concomitant feature, the inlet opening is a perforation formed in the one layer of elastomeric material in vicinity of the respective tubular chamber.

The advantages achieved with the present invention are based on the understanding that the rigidity of flat sheet constructions may be improved by slight deformations. A "deformation" of this type is obtained in the case of a pile panel in that the coated cover fabric and the relevant layer of elastomeric material of the pile fabric of double fabric are not joined together along strip-shaped regions. As a result of this at least one another, tubular air chamber is produced, without an additional material cost. When this other air chamber is inflated, it deforms the hitherto flat pile panel along this region, resulting in the mentioned increase in rigidity.

Since there is a danger that the joint between the coated cover fabric and the elastomeric layer of the relevant web of the double fabric may come apart at the edge of the other chamber, this junction is reinforced according to a preferred embodiment by bonding on angular strips, as are usually used for the production of such inflatable hollow bodies.

There are two alternatives for the production of the filling opening for inflating the other air chamber. If the double fabric is airtight in the region of the other air chamber, this other air chamber may be provided on its free outer surface with a sealable filling opening, as is also provided in principle in the case of the pile panel itself. Consequently, this other air chamber may be brought to a different pressure from the pile panel itself, so that the rigidity may be deliberately controlled.

Alternatively, it is possible to design the strip-shaped region of the double fabric to be air permeable in the region of the other air chamber, for example by the use of perforations, so that the other air chamber is filled with air at the same pressure as that of the pile panel.

Pile panels of this type, having an increased rigidity, may be used in particular in inflatable boats having a substantially greater motorization. Moreover, the other air chambers may also be designed in a tubular keel shape, so that the keel regions are produced having the required strength.

Other features which are considered as characteristic for the invention are set forth in the appended claims.

Although the invention is illustrated and described herein as embodied in a flexible hollow body fillable with fluid medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying schematic drawing.

BRIEF DESCRIPTION OF THE DRAWINGS

The single FIGURE is partially in section and shows a perspective view of a hollow body of this type.

This flexible hollow body which may be filled with air and which is generally indicated by reference numeral 10 has a conventional pile panel which is essentially formed by a double fabric or a pile fabric 12, the upper web and lower web of which are covered on the outer surface with a layer of an elastomeric material, so that a covered upper web 14 and a covered lower web 16 are produced. Pile threads 12 restrict the spacing between the covered upper web 14 and the covered lower web 16, and thus restrict the thickness of this pile panel.

The two layers of elastomeric material are joined to the relevant upper and or lower web respectively by bonding, welding and/or by vulcanization.

Cover fabrics 18 and 20 which are provided on both sides with layers of elastomeric material are applied to the covered upper web 14 and to the covered lower web 16, respectively. The coated cover fabrics 18 and 20 are attached to the covered upper web 14 and the covered lower web 16, respectively, also by bonding, welding or by vulcanization, and that is, in the embodiment of the hollow body 10 which is shown, over the complete contacting surface, excluding a strip-shaped region 24 of the upper coated fabric 18. Thus, another chamber 26 is produced between the covered upper web 14 of the pile panel and the upper coated cover fabric 18. Angular strips 28 are fitted to the peripheral regions of this other air chamber 26 where the covered upper web 14 and the upper coated cover fabric 18 meet. These angular strips 28 are fitted such that one side of the angular strip 28 is attached to the covered upper web 14 and the other side of the angular strip 28 is attached to the upper coated cover fabric 18.

In the embodiment which is shown in the figure, the pile panel has a conventional, sealable filling opening 32 for the inflation of the large air chamber 22 of the pile panel, and the other air chamber 26 has another, sealable filling opening 30 for the inflation of this air chamber 26.

Of course, the peripheral regions of the pile panel, i.e. of the large air chamber 22 are sealed in the manner known from German Published Prosecuted Application (DE-AS) No. 21 48 401, for example by an encircling beard seam or by peripheral inserts.

In the embodiment which is shown, when the large air chamber 22 is pumped up through the filling opening 32, and when the other, small, tubular air chamber 26 is pumped up through the filling opening 30, the deformation of the pile panel which may be seen from the figure is produced which results in an increase in its rigidity.

The embodiment which is shown having two separate filling openings 30 and 32 for the large air chamber 22 and the other air chamber 26, respectively, has the advantage that independent pressures may be adjusted in the two air chambers 22 and 26.

As an alternative, it is also possible to design the covered upper web 14 in the region of the other, tubular air chamber 26 to be permeable to air, for example by means of perforations, so that when the pile panels are inflated through the filling opening 32, the other air chamber 26 is also inflated with the same pressure and it received the shape which may be seen from the figure. In this case, the other filling opening 30 for the tubular air chamber 26 may by omitted.

The foregoing is a description corresponding, in substance, to German Application No. P 32 35 630.7, dated Sept. 25, 1982, International priority is being claimed for the instant application, and which is hereby made part of this application. Any material discrepancies between the foregoing specification and the specification of the aforementioned corresponding German application are to be resolved in favor of the latter.

There are claimed:

1. A flexible hollow body fillable with fluid medium for stiffening the body, comprising a double fabric having an upper web and a lower web and a multiplicity of pile filaments extending transversely to and mutually connecting sid upper and lower webs, said webs defining an inflatable chamber therebetween containing and limited in shape and size by said pile filaments, said webs respectively having an outer surface with a layer of elastomeric material disposed thereon, a coated cover fabric applied to one of said layers of elastomeric material, said cover fabric having strip-shaped regions detached from said layer of elastomeric material to which said cover fabric is applied so as to define therewith respective tubular chambers; angular strips disposed within said tubular chambers at respective edges thereof for joining said one layer of elastomeric material and said coated cover fabric to one another; said chambers being formed, respectively, with at least one inlet opening for inflating said chambers.

2. Hollow body according to claim 1 wherein another coated cover fabric is applied to the other layer of elastomeric material and additional tubular chambers are defined by detached strip-shaped regions of said other coated cover fabric applied to said other layer of elastomeric material.

3. Hollow body according to claim 1 wherein said cover fabric is coated on both sides thereof.

4. Hollow body according to claim 1 wherein said inlet opening is sealable and extends through said coated cover fabric.

5. Hollow body according to claim 1 wherein said inlet opening is a perforation formed in said one layer of elastomeric material in vicinity of the respective tubular chamber.

* * * * *